US005597523A

United States Patent [19]

Sakai et al.

[11] Patent Number: 5,597,523

[45] Date of Patent: Jan. 28, 1997

[54] MOLDING APPARATUS AND METHOD IN WHICH A MOLD CAVITY GASKET IS DEFORMED BY SEPARATELY APPLIED PRESSURE

[75] Inventors: Kunito Sakai; Kazuharu Oshio; Hirozoh Kanegae, all of Hyogo-ken, Japan

[73] Assignee: Mitsubishi Denki Kabushiki Kaisha, Tokyo, Japan

[21] Appl. No.: 292,269

[22] Filed: Aug. 18, 1994

[30] Foreign Application Priority Data

Feb. 22, 1994 [JP] Japan .................................... 6-024272

[51] Int. Cl.$^{6}$ ............................ B29C 45/02; B29C 45/14

[52] U.S. Cl. ........................ 264/219; 264/271.1; 425/116; 425/117; 425/544

[58] Field of Search .................................... 425/116, 117, 425/544; 264/272.17, 272.19, 271.1, 219; 249/93, 95, 135

[56] References Cited

U.S. PATENT DOCUMENTS

| | | | |
|---|---|---|---|
| 2,326,381 | 8/1943 | Milligan et al. | 264/DIG. 50 |
| 2,615,411 | 10/1952 | Clevenger et al. | 264/DIG. 50 |
| 3,200,442 | 8/1965 | Haller | 264/DIG. 50 |
| 4,626,185 | 12/1986 | Monnet | 425/116 |
| 4,732,553 | 3/1988 | Hofer | 425/116 |
| 4,952,135 | 8/1990 | Douglas | 264/313 |
| 5,061,429 | 10/1991 | Yoshihara et al. | 425/116 |
| 5,118,271 | 6/1992 | Baird et al. | 425/116 |
| 5,151,276 | 9/1992 | Sato et al. | 425/110 |
| 5,268,183 | 12/1993 | Garza | 425/116 |
| 5,395,226 | 3/1995 | Sakai et al. | 425/116 |

FOREIGN PATENT DOCUMENTS

| | | | |
|---|---|---|---|
| 0553486 | 8/1993 | European Pat. Off. . | |
| 1729179 | 6/1971 | Germany . | |
| 60-97815 | 5/1985 | Japan . | |
| 61-234536 | 10/1986 | Japan . | |
| 1-316237 | 12/1989 | Japan . | |
| 2-160518 | 6/1990 | Japan | 425/116 |

*Primary Examiner*—Robert Davis
*Attorney, Agent, or Firm*—Burns, Doane, Swecker & Mathis, LLP

[57] ABSTRACT

A molding apparatus having an upper mold, a lower mold, and a cylindrical mold cavity defined between the upper mold and the lower mold and adapted to receive a molding material such as epoxy resin. An annular recess is defined in the lower mold adjacent to the mold cavity. A gasket is fit in the recess and made of lead. An oil passage is defined in the lower mold. Silicon oil as a pressure medium is fed to the recess through the oil passage so as to press the gasket against the upper mold. Then, the gasket is deformed to form a seal around a portion of the mold cavity where the upper and lower molds mate with one another. An annular spacer is placed in the bottom of the recess. An annular groove is defined below and along the bottom of the recess so as to allow the silicon oil to flow below and along the annular spacer, whereby sufficient pressure is exerted uniformly on the gasket to cause deformation of the gasket.

23 Claims, 8 Drawing Sheets

40
12
15
54
52
22
42
44
26
28
18
56
16
12a
14
25
14a
24
15
50
20a
20
20b 26
28
62
60
14b
30
14
15
12
54
56
14a
12a
24
52
22
15
20
64
10

10
12
15
66
14b
22
30
26
28
14
54
56
14a
12a
24
52
20
15

26
28
30
14b
70
54
15
12
12a
56
14a
52
24
20
30
15
14
10

15
12
12a
82
80
14b
30
54
56
52
22
20
26
28
14
24
15
10

MOLDING APPARATUS AND METHOD IN WHICH A MOLD CAVITY GASKET IS DEFORMED BY SEPARATELY APPLIED PRESSURE

RELATED APPLICATION

This application is related to United States patent application Ser. No. 130,444 filed on Oct. 1, 1993 and now U.S. Pat. No. 5,395,226.

BACKGROUND OF THE INVENTION

1. Field of the Invention

The present invention relates to a molding apparatus and method for shaping a plastic or metal substance without producing undesirable burrs.

2. Description of the Related Art

Japanese Laid-Open Patent Publication No. 160518/90 discloses a molding machine for encapsulating a circuit or other electronic parts in resin (see FIG. 9). A lead frame is sandwiched between upper and lower molds. The lower mold has a cavity for receiving an encapsulating material such as epoxy resin under pressure. A groove is defined around and spaced from the cavity to form a partition therebetween. A resilient gasket made of silicon rubber is fitted in the groove and projects slightly upwardly from the upper surface of the lower mold. When the upper and lower molds are clamped together, the gasket is elastically deformed to closely contact with the lead frame. However, the encapsulating resin still tends to leak from the mold cavity and enter between the lower surface of the lead frame and the partition. When this occurs, undesirable burrs will result. This is due to the fact that the lead frame is placed in metal-to-metal contact with the end surface of the partition, and a clearance of the order of a few microns remains between the lead frame and the partition. The resulting burrs not only physically damage the gasket, but also cause the molten resin to leak from the mold cavity. This molten resin could chemically damage the gasket and thus, reduce the service life of the gasket.

SUMMARY OF THE INVENTION

It is an object of the present invention to provide a molding apparatus and method, which can shape a plastic or metal substance without producing undesirable burrs.

According to one aspect of the present invention, there is provided a molding apparatus which comprises first and second molds, both made of metal, and a mold cavity defined between the first and second molds and adapted to receive a molding material such as epoxy resin. A recess is defined adjacent to the mold cavity. A gasket is fit in the recess and made of a deformable material such as lead. Means are provided to press the gasket so that the gasket is deformed to form a seal around the mold cavity. A pressure medium such as silicon oil is used to press the gasket. Also, means are provided to define a space adjacent to tile bottom of the recess. This space allows the pressure medium to flow below and along the gasket. In this way, sufficient pressure can be exerted on the gasket to cause deformation of the gasket.

Preferably, a groove is defined below and along the bottom of the recess. A spacer is placed in the bottom of the recess. When the pressure medium is applied to the groove, the plate is urged upwardly to press the gasket against the first mold. Alternatively, a spacer of an inverted U-shaped cross section may be placed in the bottom of the recess to form a space between the spacer and the bottom of the recess.

The gasket may also be made of synthetic resin, plastic or other electrically insulative organic materials. The synthetic resin is selected from the group including silicon rubber, nitrile rubber and fluorine rubber. Also, the plastic is selected from the group including polytetrafluoroethylene, polypropylene, nylon, polyphenylene sulfide, polyethylene, polybutylene terephthalate, polymethylpentene and polyimide.

According to another aspect of the present invention, there is provided a molding method comprising the steps of (a) preparing a molding apparatus including a first mold made of metal, a second mold made of metal and cooperating with the first mold to define a mold cavity when the first and second molds are clamped together, a recess defined adjacent to the mold cavity and having an open top and a bottom, and at least one passage having one end communicated with the recess and the other end connected to a source of pressure medium; (b) defining a space adjacent to the bottom of the recess; (c) preparing a gasket made of a deformable material; (d) effecting relative movement between the first and second molds so as to fit the gasket in the recess; (e) feeding a pressure medium from the source of pressure medium to the space through the passage so as to press the gasket, whereby the gasket is deformed to form a seal around the mold cavity; and (f) introducing a molding material into the mold cavity.

The gasket is formed by pouring a molten metal into the recess and solidifying the molten metal. The molten metal preferably has a larger volume than the recess. Alternatively, the gasket may be formed by placing a solid metal on and along the recess and mechanically forcing the solid metal into the recess.

Also, the gasket may be formed by pouring a synthetic rubber in liquid form into the recess and heating the first and second molds so as to cure the synthetic rubber. The gasket may alternatively be formed by placing a plastic material on and along the recess, heating the first and second molds so as to soften the plastic material, and curing the softened plastic material.

These and other objects, features and advantages of the present invention will become apparent from the following description when taken in conjunction with the accompanying drawings.

DESCRIPTION OF THE PREFERRED EMBODIMENTS

Figure 1:
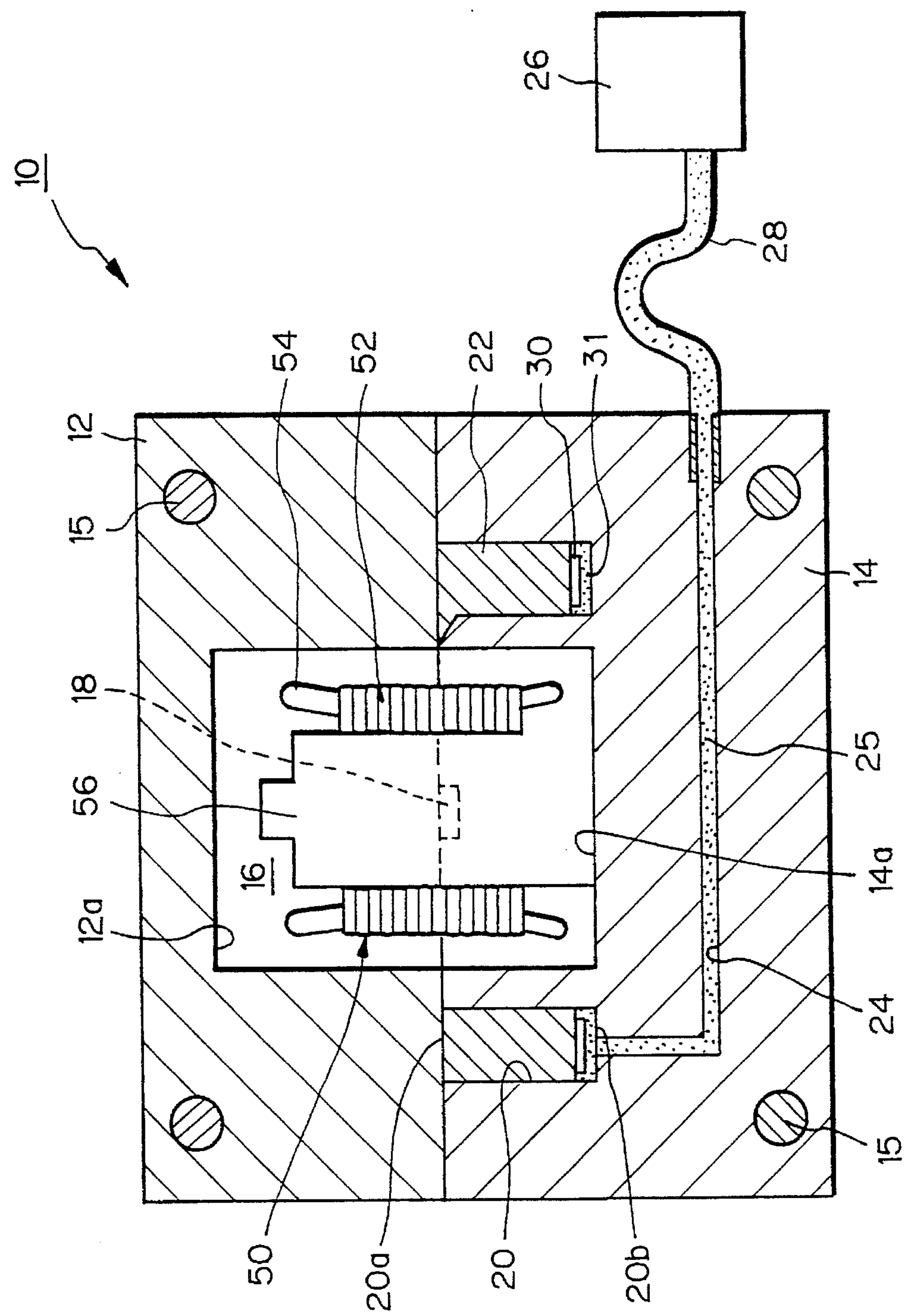
FIG. 1 is a vertical sectional view of a molding apparatus made according to a first embodiment of the present invention.

Like reference numerals indicate like or corresponding parts throughout several views of the drawings.

Referring now to FIG. 1, there is shown a molding apparatus constructed according to a first embodiment of the present invention and generally indicated by reference numeral 10. The molding apparatus 10 comprises an upper mold 12 and a lower mold 14, both made of metal such as iron and including a plurality of heaters 15. The upper and lower molds have a length of 300 mm and a width of 300 mm. The lower mold 14 is vertically moved to and from the upper mold 12. Alternatively, the upper mold 12 may be moved to and from the lower mold 14. The upper mold 12 and the lower mold 14 are clamped under a pressure of approximately 30 tons (38 kg/cm$^2$) by a clamp or similar means (not shown). The upper mold 12 has a downwardly open cavity **12*a*. The lower mold 14 has an upwardly open cavity 14*a* adapted to cooperate with the cavity 12*a* of the upper mold 12 to define a mold cavity 16 when the upper mold 12 and the lower mold 14 are clamped together. The mold cavity 16 is cylindrical in shape and has a diameter of approximately 20 mm. A molding material is introduced into the mold cavity 16 through a gate 18** so as to shape a plastic or metal substance.

Due to manufacturing tolerances, a clearance of the order of a few microns tends to remain between the upper and lower molds in a clamped condition, particularly when the molds are heated. If such a clearance exists, a molding material may flow out of the mold cavity 16 and into the clearance. When this occurs, undesirable burrs will result. To avoid this, means are provided to fill the clearance between the upper mold 12 and the lower mold 14. Specifically, an annular recess 20 is defined in the lower mold 14 and surrounds the mold cavity 16. The recess 20 has an open top **20*a* and a bottom 20*b*. The open top 20*a* has an inner diameter of 120 mm and an outer diameter of 134 mm. The width of the open top 20*a* is thus 7.0 mm. The open top 20*a* of the recess is tapered toward the mold cavity 16. The inner peripheral edge of the open top 20*a* is substantially coincide with the open edge of the cavity 14*a* of the lower mold 14 and extends along a portion of the mold cavity 16 where the upper mold 12 and the lower mold 14 mate with one another. The recess 20 has a height of 5.0 mm. The bottom 20*b* of the recess 20 has an inner diameter of 126 mm and an outer diameter of 134 mm. The bottom 20*b*** thus has a width of 4.0 mm.

A gasket 22 is fit in the recess 20 and made of a deformable metal such as lead. Means are provided to urge or press the gasket 22 against the lower surface of the upper mold 12. Specifically, an oil passage 24 is defined in the lower mold 14 and has one end communicated with the interior of the recess 20 and the other end connected to an external hydraulic pump 26 through a flexible hose 28. The flexible hose 28 is long enough to follow vertical movement of tile lower mold 14. The oil passage 24 has an inner diameter of 3.0 mm. The number of oil passages is not limited to the illustrated embodiment. A plurality of oil passages may be defined in the lower mold 14. A silicon oil 25 as a pressure medium is filled in the oil passage 24. The silicon oil is resistant to heat and has a viscosity of approximately 500,000 pcs at room temperature. The silicon oil is fed from the hydraulic pump 26 through the oil passage 24 to the recess 20 under a pressure of approximately 250 kg/cm$^2$ so as to press the gasket 22 against the lower surface of the upper mold 12. When this occurs, the gasket 22 is plastically deformed to thereby fill clearances which may be formed between the upper and lower molds in a clamped condition. This arrangement prevents a molding material from flowing out of the mold cavity 16 and thus, the formation of any undesirable burrs.

In the embodiment shown in FIG. 1, a single annular plate-like member or spacer 30, made of metal, is placed in the bottom of the recess 20. The spacer 30 has a slightly narrower width than the recess, for example, 3.9 mm, and has a thickness of 1.0 mm. Since the lower mold 14 and the spacer 30 are both made of metal, a space 31 of typically 0.1 mm is left between the spacer 30 and the bottom of the recess 20. This space 31 allows the silicon oil to flow below and along the spacer 30 to uniformly press the gasket 22 against the upper mold 12. A plurality of arcuate plate-like members (not shown) may alternatively be placed in the bottom of the recess 20. In such a case, a corresponding number of oil passages may preferably be defined in the lower mold 14.

Figure 2:
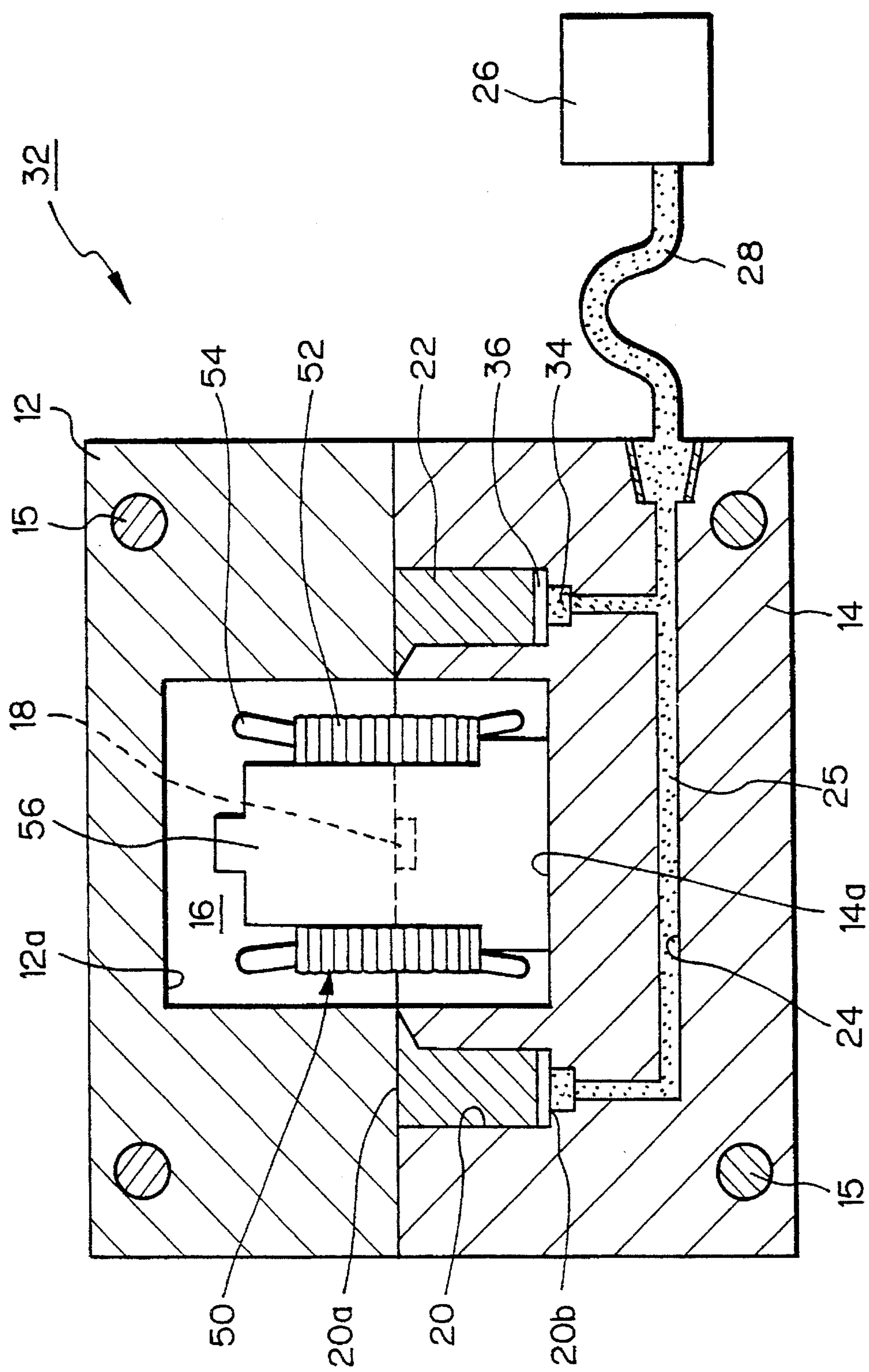
FIG. 2 is a vertical sectional view of a molding apparatus made according to a second embodiment of the present invention.

FIG. 2 shows a molding apparatus made according to a second embodiment of the present invention and generally indicated by reference numeral 32. The molding apparatus 32 is different from the molding apparatus of FIG. 1 only in that in the former, an annular groove 34 is defined below and along the bottom of the recess 20 and is communicated with the recess 20 and the oil passage 24. An annular plate 36 has substantially the same width as the recess 20 and is placed in the bottom of the recess 20. The annular plate 36 is intended to prevent a material for forming the gasket from flowing into the oil passage 24. The annular groove 34 allows the silicon oil to flow below and along the gasket 22 so as to uniformly press the gasket 22 against the upper mold 12 under sufficient pressure.

Figure 3:
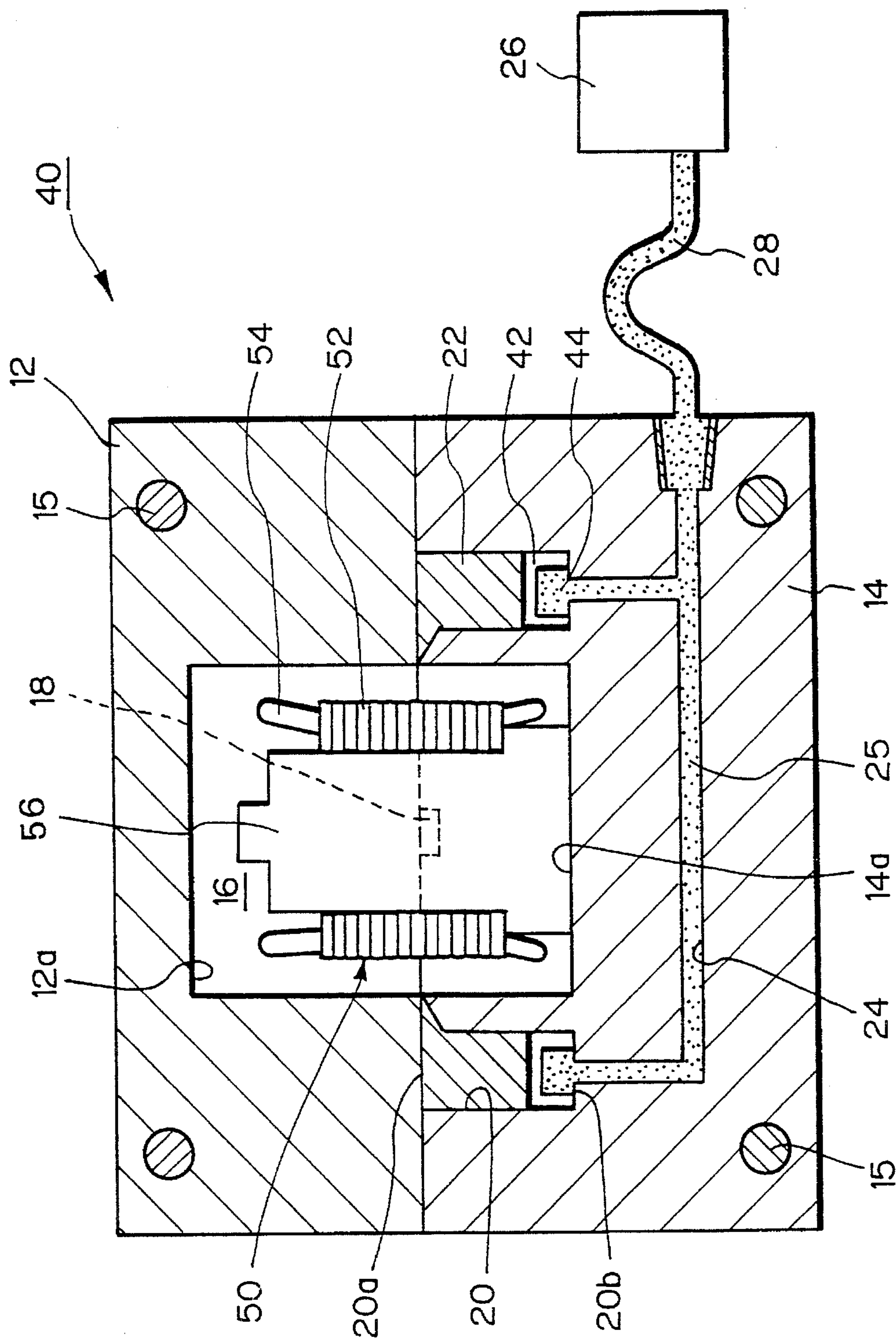
FIG. 3 is a vertical sectional view of a molding apparatus made according to a third embodiment of the present invention.

FIG. 3 shows a molding apparatus made according to a third embodiment of the present invention and generally indicated by reference numeral 40. In this embodiment, an annular member 42 of an inverted-U-shaped cross section is placed in the bottom of the recess 20 to form an annular space 44 between the annular member 42 and the bottom **20*b* of the recess. This space 44 allows the silicon oil to flow below and along the gasket 22 so as to uniformly press the gasket 22 against the lower surface of the upper mold 12 under sufficient pressure. The annular member 42, made of metal, has a width of 4.9 mm and a thickness of 2.0 mm. The space 44** has a width of 2.0 mm and a depth of 1.0 mm.

Reference will next be made to a molding method according to the present invention. Illustratively, the invention is applied to encapsulation of a motor stator in resin, but is not limited thereto.

First, the upper mold 12 and the lower mold 14 in a clamped condition are heated to a temperature in the range of 150° to 400° C., for example, 250° C. by means of the heaters 15. A motor stator 50 is placed in the bottom of the cavity **14*a* after the lower mold 14 has been separated from the upper mold 12. The stator 50 comprises a core 52 and a winding 54 and has been heated to a temperature of approximately 150° C. before it is arranged within the cavity 14*a*. A suitable support 56 is disposed centrally in the cavity 14*a* to hold the stator 50** in place.

Figure 4:
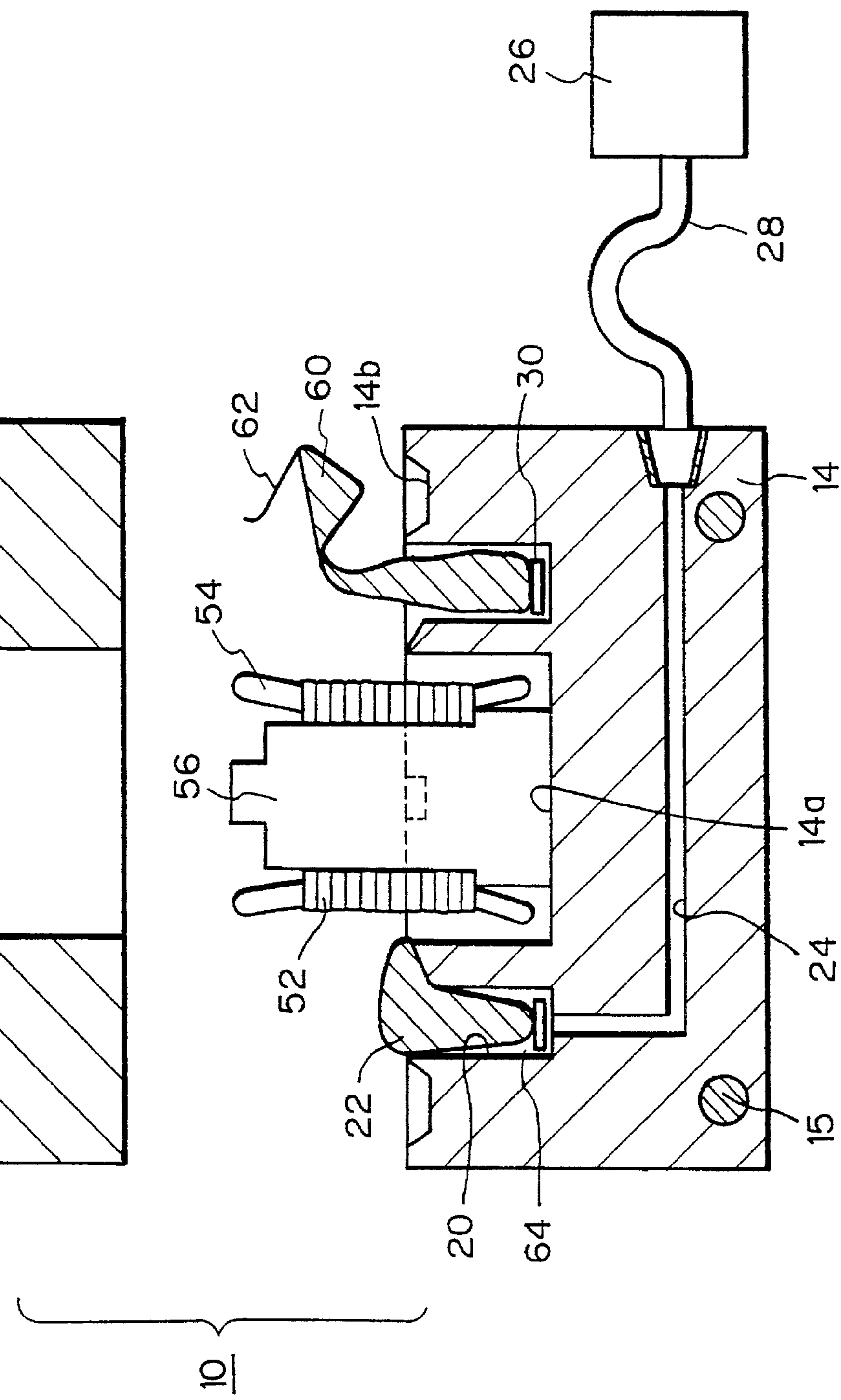
FIGS. 4 and 5 show the manner in which a gasket is produced according to one embodiment of the present invention.
Figure 5:
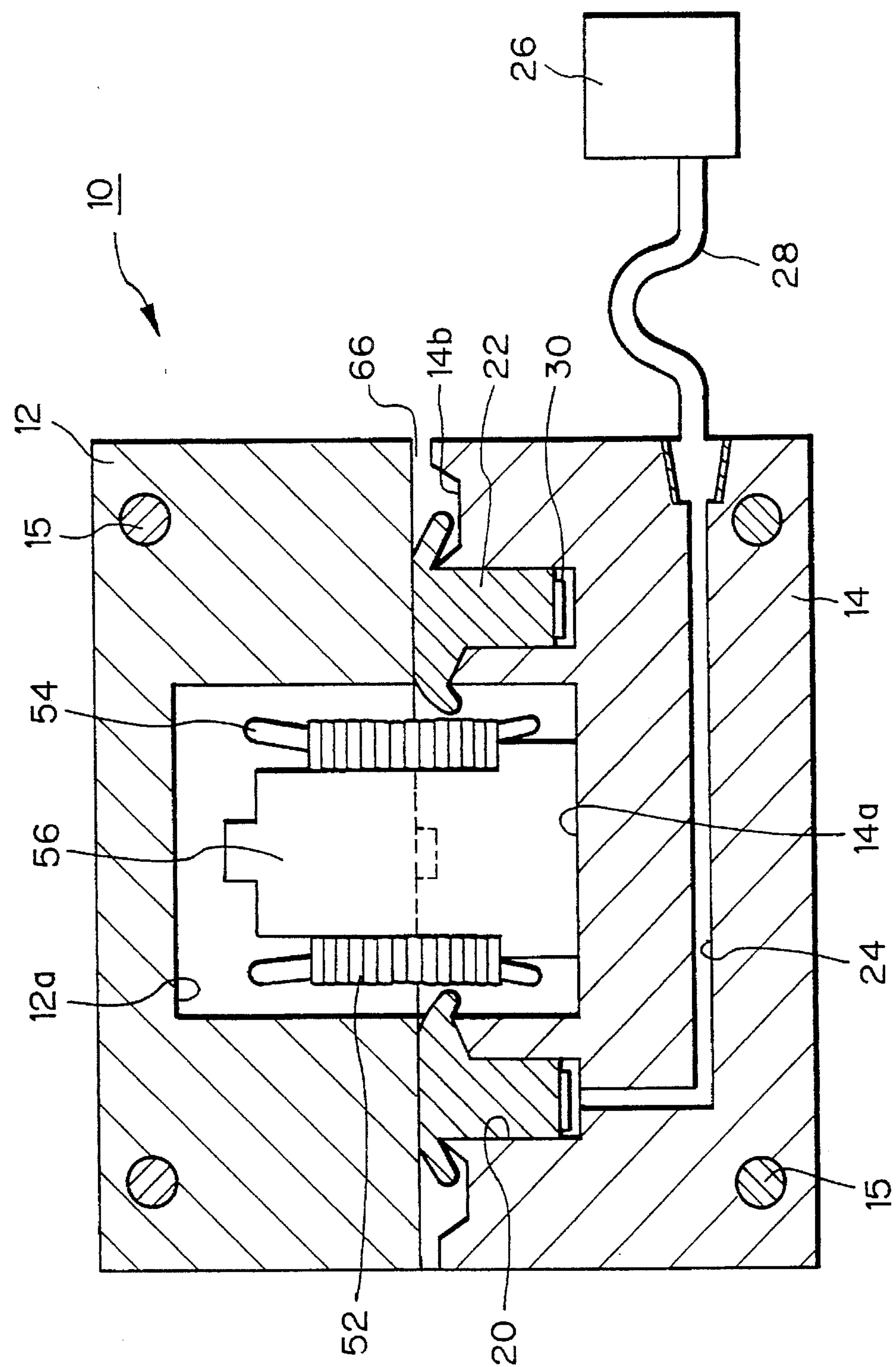

FIGS. 4 and 5 illustrate how the gasket is produced. A molten lead 60 is heated to a temperature of at least 328° C.

in a hot container 62 and then poured into the recess 20. At this time, the hot container 62 is situated above and moved along the recess 20. The volume of the recess 20 is about 10 ml. The volume of the molten lead, for example, 14 ml, is preferably greater than that of the recess 20 so that the gasket, after the molten lead has been solidified, projects upwardly from the upper surface of the recess 20. The molten lead 60 is solidified immediately after it has been poured into the recess 20 since the temperature of tile molten lead 60 is much higher than that of the lower mold 14. As a result, a gap 64 is formed between the inner wall of the recess 20 and a part of the gasket 22 within the recess 20. In order to fill this gap 64, the upper mold 12 and tile lower mold 14 are clamped to gradually press the gasket against the bottom 20*b* of the recess 20. The gasket is then deformed or spread in the recess so as to fill the gap 64 as shown in FIG. 5. At this time, the spacer 30 prevents entry of the lead or gasket into the oil passage 24. If the lead enters into the oil passage 24, the silicon oil can not flow uniformly below the gasket 22 and is unable to press the gasket 22 against the upper mold 12 under sufficient pressure. The spacer 30 is placed in metal-to-metal contact with the bottom 20*b* of the recess 20. As such, a space is left between the spacer 30 and the bottom 20*b* of the recess 20. This space allows the silicon oil to flow below and along the spacer 30 so as to press the gasket 22 against the upper mold 12 under sufficient pressure.

The upper mold 12 and the lower mold 14 are repeatedly clamped until the upper surface of the gasket 22 becomes substantially flush with the upper surface of the lower mold 14. As shown in FIGS. 4 and 5, the lower mold 14 preferably has a side recess 14*b* around the recess 20 to receive an extra amount of lead. This arrangement is advantageous in that more force is required as a gap 66 between the upper mold 12 and the lower mold 14 becomes smaller. After the gasket is completed, the extra amount of lead is removed from the side recess 14*b* as well as the cavity 14*a*.

Figure 6:
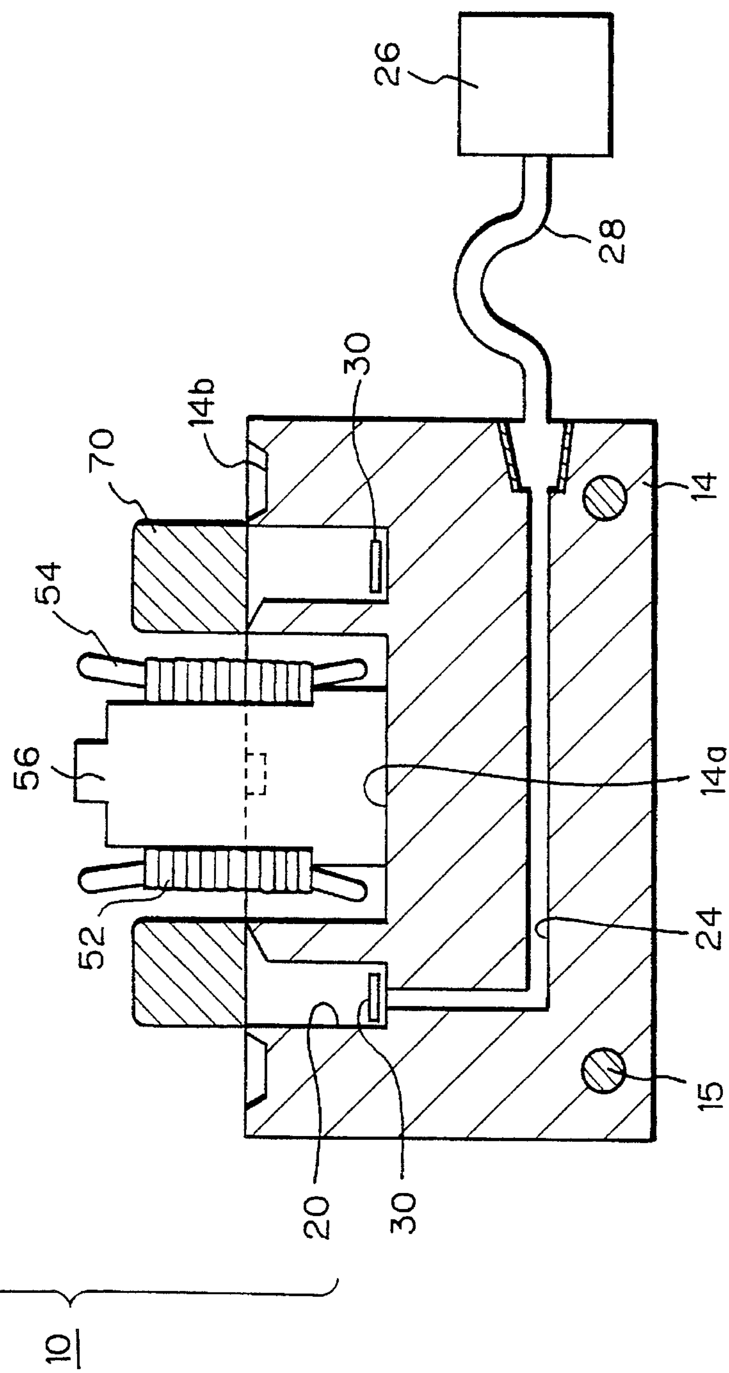
FIG. 6 shows the manner in which a gasket is produced according to another embodiment of the present invention.

The gasket may be produced in an alternative manner. As shown in FIG. 6, a doughnut-like lead in solid phase 70 is placed on the lower mold 14 above the recess 20. The doughnut-like lead 70 has an inner diameter of 120 mm, an outer diameter of 134 mm, and a height of 5.0 mm. Thus, the volume of the lead 70 is approximately 14 ml and greater than that of the recess 20. The solid lead is forced into the recess 20 when the upper mold 12 and the lower mold 14 are clamped. The upper mold 12 and the lower mold 14 are repeatedly clamped until the upper surface of the gasket 22 becomes substantially flush with the upper surface of the lower mold 14.

Alternatively, the upper mold 12 and the lower mold 14 are heated over 328° C. so as to melt the solid lead 70 which is placed on and along the recess 20. The molten lead then enters into the recess 20. After the recess 20 has been filled, the upper mold 12 and the lower mold 14 are cooled to a temperature below the melting point of the lead so as to solidify the lead. Thereafter, the upper mold 12 and the lower mold 14 are repeatedly clamped until the upper surface of the gasket becomes substantially flush with the upper surface of the lower mold 14. It will be understood that solder, gold, silver, aluminum, copper, tin or their alloys may also be used to produce the gasket.

The gasket may alternatively be made of synthetic resin, plastic or other electrically insulative organic materials. The synthetic resin is selected from the group including silicon rubber, nitrile rubber and fluorine rubber. The gasket 22 made of such a synthetic resin is subject to elastic deformation when it is pressed against the upper mold 12. The plastic is selected from the group including polytetrafluoroethylene, polypropylene, nylon, polyphenylene sulfide, polyethylene, polybutylene terephthalate, polymethylpentene, and polyimide. The gasket made of such a plastic is subject to plastic deformation when it is pressed against the upper mold 12.

After the upper mold 12 and the lower mold 4 have been clamped under a pressure of approximately 30 tons, the hydraulic pump 26 is operated to feed the silicon oil 24 so as to urge the gasket 22 against the upper mold 12 under a pressure of approximately 250 kg/cm$^2$. At this time, the silicon oil 25 enters between the spacer 30 and the bottom of the recess 20. This enables uniform compression of the gasket 22. A molding material such as epoxy resin is introduced into the mold cavity 16 through the gate 18 under a pressure of 30 kg/cm$^2$ for a period of approximately 20 seconds. The internal pressure of the mold cavity 16 is barely changed until the mold cavity 16 is filled with the epoxy resin. The internal pressure of the mold cavity 16 is suddenly raised to 30 kg/cm$^2$ when the mold cavity 16 has been filled. The epoxy resin will not leak from the mold cavity 16 since the pressure under which the gasket 22 is urged against the upper mold 12 is much higher than the internal pressure of the mold cavity. The epoxy resin is cured in approximately 40 seconds. Until then, the epoxy resin is kept pressurized under a pressure of 30 kg/cm$^2$ so as to prevent contraction of the molded product. After the epoxy resin has been cured, the pressures of the epoxy resin and the silicon oil are both reduced below 1.0 kg/cm$^2$. The lower mold 14 is then moved away from the upper mold 12 to allow removal of the molded product or stator from the mold cavity 16. This cycle of operation is also applicable to the embodiments shown in FIGS. 2 and 3.

Figure 7:
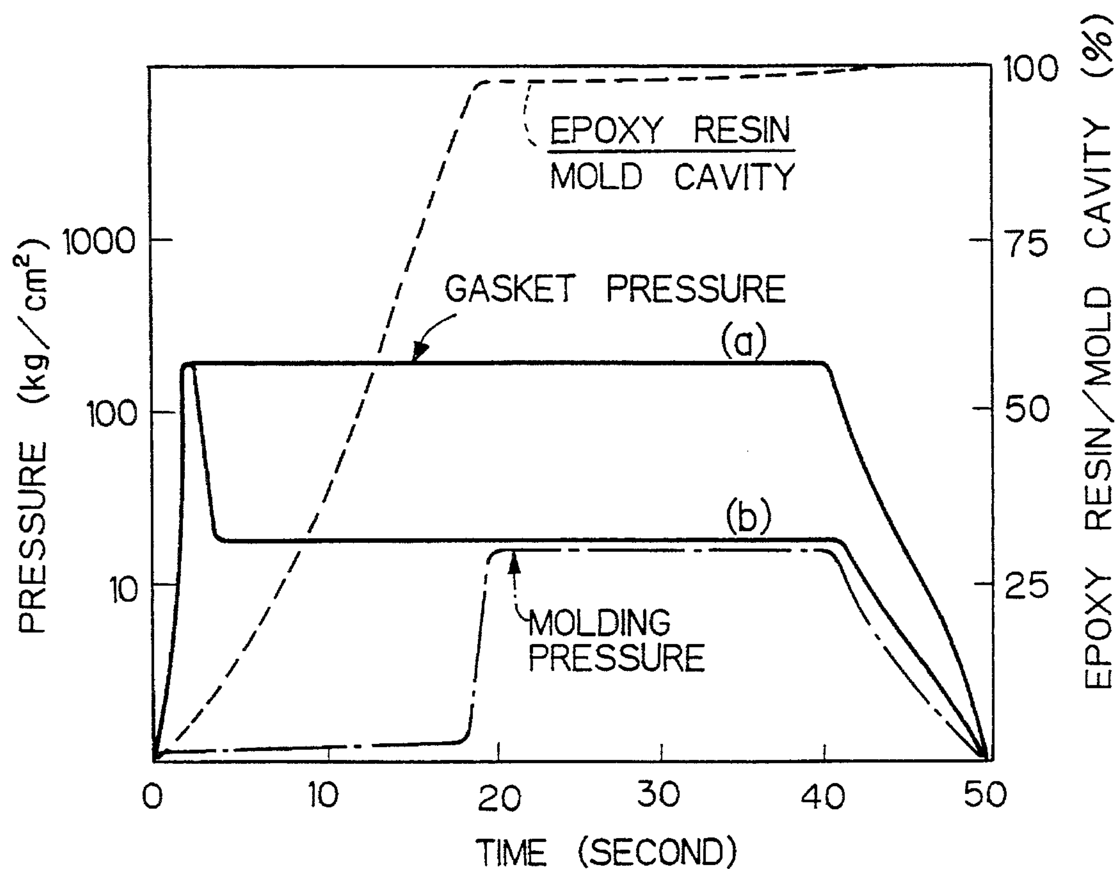
FIG. 7 is a graph showing the relationship between the pressure under which epoxy resin is injected into a mold cavity and the pressure under which the gasket is pressed against an upper mold.
Figure 9:
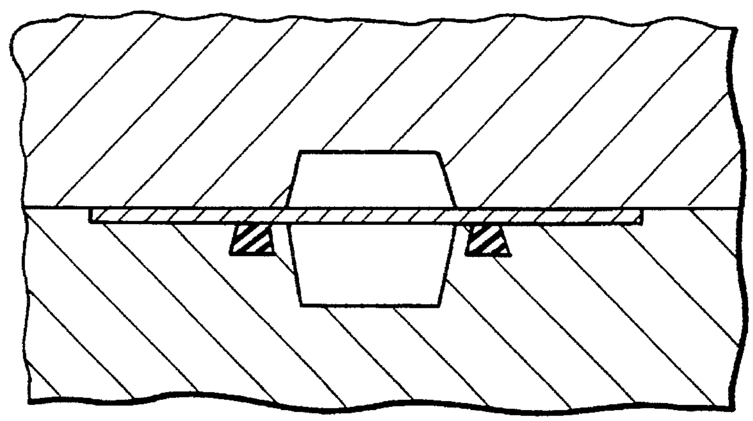
FIG. 9 is a sectional view, in part, of a conventional molding apparatus.

In the illustrated embodiment, the gasket 22 is urged against the upper mold 12 under a pressure of 250 kg/cm$^2$ for a period of approximately 40 seconds, as shown in line (a) of FIG. 7, after the upper and lower molds have been clamped together. Such a high pressure is necessary only during the initial stage of the molding process in order to sufficiently deform the gasket 22 to completely fill clearances between the upper mold 12 and the lower mold 14. As shown in line (b) of FIG. 7, the pressure may be reduced to a level slightly higher than the internal pressure of the mold cavity, that is, 30 kg/cm$^2$ after the clearances have been filled. This is due to the fact that the gasket made of lead is subject to plastic deformation rather than elastic deformation when it is pressed against the upper mold 12.

Figure 8:
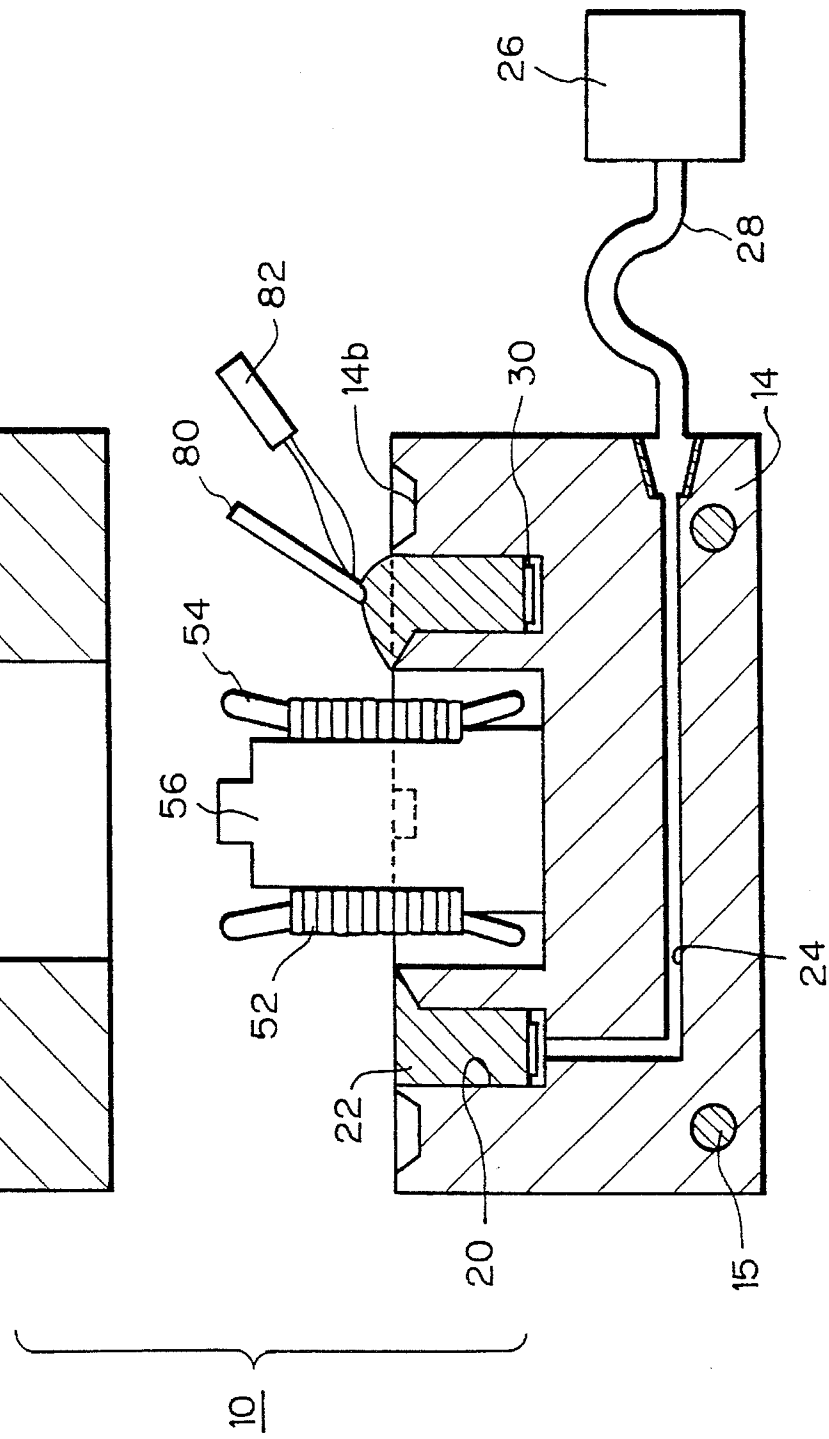
FIG. 8 shows the manner in which the gasket is repaired.

If the gasket 22 is damaged, the silicon oil 25 may leak from the oil passage and is unable to sufficiently deform the gasket. It is time-consuming and costly to replace tile damaged gasket with an entirely new gasket. To repair the damaged gasket, extra lead may be placed on the damaged gasket, and the upper and lower molds are then clamped to attach the extra lead to the damaged gasket. In such a way, however, tile extra lead tends to be separated relatively easily from the gasket. FIG. 8 illustrates the manner in which a damaged gasket is repaired according to the present invention. After the gasket 22 has been inserted into the recess 20, a lead bar 80 is positioned on the gasket 22. A welding tool 82 is activated to melt the lead bar 80 on the gasket 22. As a result, the gasket 22 projects upwardly from the upper surface of the recess 20. The upper and lower molds are then clamped to flatten a part of the gasket that projects above the recess. In this way, the gasket can be repaired without any seams. In the illustrated embodiment, the same material, namely lead, is used to repair the gasket. It will be understood that tin, gold or other metals that form a lead-base alloy may be employed. The same procedure is applicable to the case in which the gasket is made of synthetic resin and plastic.

Although several embodiments of the present invention have been described in detail, it is to be understood that many modifications and changes may be made without departing from the spirit and scope of the invention. For example, the invention is applicable to a die casting or a lost wax process.

What is claimed is:

1. A molding apparatus comprising:

a first mold made of metal;

a second mold made of metal and cooperating with said first mold to define a mold cavity when said first and second molds are clamped together, said mold cavity being adapted to receive a molding material;

a recess defined around said mold cavity and having a bottom and an open top with an edge extending along and substantially coinciding with a portion of the mold cavity where said first and second molds mate with each other;

a gasket received in said recess and made of a deformable material;

means for pressing said gasket so that said gasket is deformed to seal said portion of the mold cavity, said means for pressing including a source of pressure medium and at least one passage having one end communicated with said recess and the other end connected to said source of pressure medium; and means for defining a space adjacent to the bottom of said recess so as to allow a pressure medium to flow below and along said gasket, whereby sufficient pressure is exerted uniformly on said gasket to cause deformation of said gasket, said means for defining including at least one spacer member and placed in the bottom of said recess, whereby said space is defined between said at least one spacer member and the bottom of said recess.

2. A molding apparatus comprising:

a first mold made of metal;

a second mold made of metal and cooperating with said first mold to define a mold cavity when said first and second molds are clamped together, said mold cavity being adapted to receive a molding material;

a recess defined around said mold cavity and having a bottom and an open top with an edge extending along and substantially coinciding with a portion of the mold cavity where said first and second molds mate with each other;

a gasket received in said recess and made of a deformable material;

means for pressing said gasket so that said gasket is deformed to seal said portion of the mold cavity, said means for pressing including a source of pressure medium and at least one passage having one end communicated with said recess and the other end connected to said source of pressure medium; and means for defining a space adjacent to the bottom of said recess so as to allow a pressure medium to flow below and along said gasket, whereby sufficient pressure is exerted uniformly on said gasket to cause deformation of said gasket, said means for defining including a groove defined below and along the bottom of said recess and communicated with said at least one passage, and at least one spacer placed in the bottom of said recess.

3. A molding apparatus comprising:

a first mold made of metal;

a second mold made of metal and cooperating with said first mold to define a mold cavity when said first and second molds are clamped together, said mold cavity being adapted to receive a molding material;

a recess defined around said mold cavity and having a bottom and an open top with an edge extending along and substantially coinciding with a portion of the mold cavity where said first and second molds mate with each other;

a gasket received in said recess and made of a deformable material;

means for pressing said gasket so that said gasket is deformed to seal said portion of the mold cavity, said means for pressing including a source of pressure medium and at least one passage having one end communicated with said recess and the other end connected to said course of pressure medium; and means for defining a space adjacent to the bottom of said recess so as to allow a pressure medium to flow below and along said gasket, whereby sufficient pressure is exerted uniformly on said gasket to cause deformation of said gasket, said means for defining including at least one spacer having an inverted U-shaped cross section and placed in the bottom of said recess, whereby said space is defined between said at least one spacer and the bottom of said recess.

4. A molding apparatus according to claim 1, wherein said gasket is made of a metal and is subject to plastic deformation when the pressure medium is applied.

5. A molding apparatus according to claim 4, wherein said metal is selected from the group consisting of lead, solder, gold, silver, aluminum, copper, tin and their alloys.

6. A molding apparatus according to claim 1, wherein said gasket is made of a synthetic rubber and is subject to elastic deformation when the pressure medium is applied.

7. A molding apparatus according to claim 6, wherein said synthetic rubber is selected from the group consisting of silicon rubber, nitrile rubber and fluorine rubber.

8. A molding apparatus according to claim 1, wherein said gasket is made of a plastic material and is subject to plastic deformation when the pressure medium is applied.

9. A molding apparatus according to claim 8, wherein said plastic material is selected from the group consisting of polytetrafluoroethylene, polypropylene, nylon, polyphenylene sulfide, polyethylene, polybutylene terephthalate, polymethylpentene, and polyimide.

10. A molding apparatus according to claim 1, wherein said mold cavity is substantially cylindrical, and said recess is substantially circular and extends around said mold cavity, and wherein said edge of said open top of the recess is tapered toward said portion of said mold cavity.

11. A molding apparatus comprising:

an upper mold made of metal;

a lower mold made of metal and cooperating with said upper mold to define a mold cavity when said upper and lower molds are clamped together, said mold cavity being adapted to receive a molding material;

a recess defined in said lower mold adjacent to said mold cavity and having an open top and a bottom;

a gasket fit in said recess and made of a deformable material;

means for pressing said gasket so that said gasket is deformed to form a seal around said mold cavity, said means for pressing including a source of pressure medium and at least one passage having one end communicated with said recess and the other end connected to said source of pressure medium; and means for defining a space adjacent to the bottom of said recess so as to allow a pressure medium to flow below and along said gasket, whereby sufficient pressure is exerted on said gasket to cause deformation of said gasket, said means for defining including a substantially flat spacer and placed in the bottom of said recess with said space left between said substantially flat spacer and the bottom of said recess.

12. A molding apparatus comprising:

an upper mold made of metal;

a lower mold made of metal and cooperating with said upper mold to define a mold cavity when said upper and lower molds are clamped together, said mold cavity being adapted to receive a molding material;

a recess defined in said lower mold adjacent to said mold cavity and having an open top and a bottom;

a gasket fit in said recess and made of a deformable material;

means for pressing said gasket so that said gasket is deformed to form a seal around said mold cavity, said means for pressing including a source of pressure medium and at least one passage having one end communicated with said recess and the other end connected to said source of pressure medium; and means for defining a space adjacent to the bottom of said recess so as to allow a pressure medium to flow below and along said gasket, whereby sufficient pressure is exerted on said gasket to cause deformation of said gasket, said means for defining including a groove defined below and along the bottom of said recess and communicated with said one end of said at least one passage, and a spacer placed in the bottom of said recess.

13. A molding apparatus comprising:

an upper mold made of metal;

a lower mold made of metal and cooperating with said upper mold to define a mold cavity when said upper and lower molds are clamped together, said mold cavity being adapted to receive a molding material;

a recess defined in said lower mold adjacent to said mold cavity and having an open top and a bottom;

a gasket fit in said recess and made of a deformable material;

means for pressing said gasket so that said gasket is deformed to form a seal around said mold cavity, said means for pressing including a source of pressure medium and at least one passage having one end communicated with said recess and the other end connected to said source of pressure medium; and means for defining a space adjacent to the bottom of said recess so as to allow a pressure medium to flow below and along said gasket, whereby sufficient pressure is exerted on said gasket to cause deformation of said gasket, said means for defining including a spacer having an inverted U-shaped cross section and placed in the bottom of said recess to form said space.

14. A molding method comprising:

(a) preparing a molding apparatus, said molding apparatus including a first mold made of metal, a second mold made of metal and cooperating with said first mold to define a mold cavity when said first and second molds are clamped together, a recess defined adjacent to said mold cavity and having an open top and a bottom, and at least one passage having one end connected with said recess and the other end connected to a source of pressure medium;

(b) placing at least one spacer member in the bottom of said recess to define a space adjacent to the bottom of said recess;

(c) preparing a gasket made of a deformable material;

(d) effecting relative movement between said first and second molds so as to fit said gasket in said recess 1;

(e) feeding a pressure medium from said source of pressure medium to said space through said at least one passage so as to press said gasket, whereby said gasket is deformed to form a seal around said mold cavity; and (f) introducing a molding material into said mold cavity.

15. A molding method comprising the steps of:

(a) preparing a molding apparatus, said molding apparatus including a first mold made of metal, a second mold made of metal and cooperating with said first mold to define a mold cavity when said first and second molds are clamped together, a recess defined adjacent to said mold cavity and having an open top and a bottom, and at least one passage having one end communicated with said recess and the other end connected to a source of pressure medium;

(b) forming a groove below and along the bottom of said recess to define a space adjacent to the bottom of said recess, and placing at least one spacer in the bottom of said recess, said groove being communicated with said recess and said one end of said at least one passage;

(c) preparing a gasket made of a deformable material;

(d) effecting relative movement between said first and second molds so as to fit said gasket in said recess;

(e) feeding a pressure medium from said source of pressure medium to said space through said at least one passage so as to press said gasket, whereby said gasket is deformed to form a seal around said mold cavity; and (f) introducing a molding material into said mold cavity.

16. A molding method comprising the steps of:

(a) preparing a molding apparatus, said molding apparatus including a first mold made of metal, a second mold made of metal and cooperating with said first mold to define a mold cavity when said first and second molds are clamped together, a recess defined adjacent to said mold cavity and having an open top and a bottom, and at least one passage having one end communicated with said recess and the other end connected to a source of pressure medium;

(b) placing at least one spacer of an inverted U-shaped cross section in the bottom of said recess to define a space adjacent to the bottom of said recess;

(c) preparing a gasket made of a deformable material;

(d) effecting relative movement between said first and second molds so as to fit said gasket in said recess;

(e) feeding a pressure medium from said source of pressure medium to said space through said at least one passage so as to press said gasket, whereby said gasket is deformed to form a seal around said mold cavity; and (f) introducing a molding material into said mold cavity.

17. A molding method according to claim 14, wherein in the step (c), said gasket is formed by pouring molten metal into said recess and solidifying the molten metal, said molten metal having a larger volume than said recess.

18. A molding method according to claim 17, wherein said gasket is subject to plastic deformation when the pressure medium is applied.

19. A molding method according to claim 14, wherein in the step (c), said gasket is formed by placing a solid metal on and along said recess and mechanically forcing the solid metal into said recess, said metal having a larger volume than said recess.

20. A molding method according to claim 14, wherein in the step (c), said gasket is formed by placing a solid metal on and along said recess, heating said first mold and said second mold so as to melt the solid metal, and cooling and solidifying the molten metal, said metal having a larger volume than said recess.

21. A molding method according to claim 20, wherein said gasket is subject to plastic deformation when the pressure medium is applied.

22. A molding method according to claim 14, wherein in the step (c), said gasket Is formed by pouring a synthetic rubber in liquid form into said recess and heating said first and second molds so as to cure said synthetic rubber, said synthetic rubber having a larger volume than said recess.

23. A molding method according to claim 14, wherein in the step (c), said gasket is formed by placing a plastic material on and along said recess, heating said first and second molds so as to soften the plastic material, and curing the softened plastic material, said plastic material having a larger volume than said recess.

* * * * *